(No Model.) 3 Sheets—Sheet 1.
H. A. HANCOX.
AUTOMATIC RAILWAY SWITCH.
No. 467,409. Patented Jan. 19, 1892.
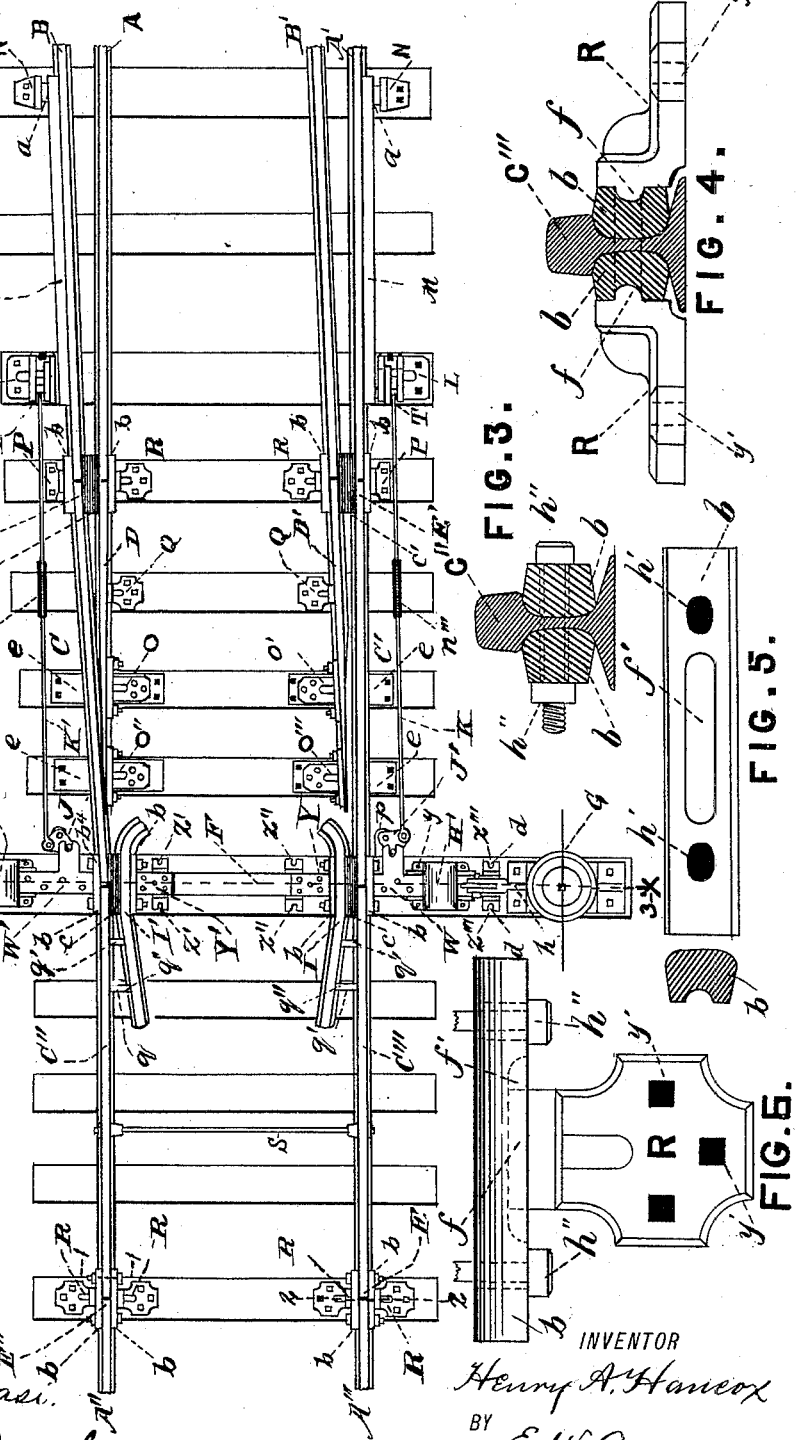
WITNESSES:
Philip McMan.
Geo. H. Parmelee.
INVENTOR
Henry A. Hancox
BY E. W. Anderson
ATTORNEY (No Model.) 3 Sheets—Sheet 2.
H. A. HANCOX.
AUTOMATIC RAILWAY SWITCH.
No. 467,409. Patented Jan. 19, 1892.
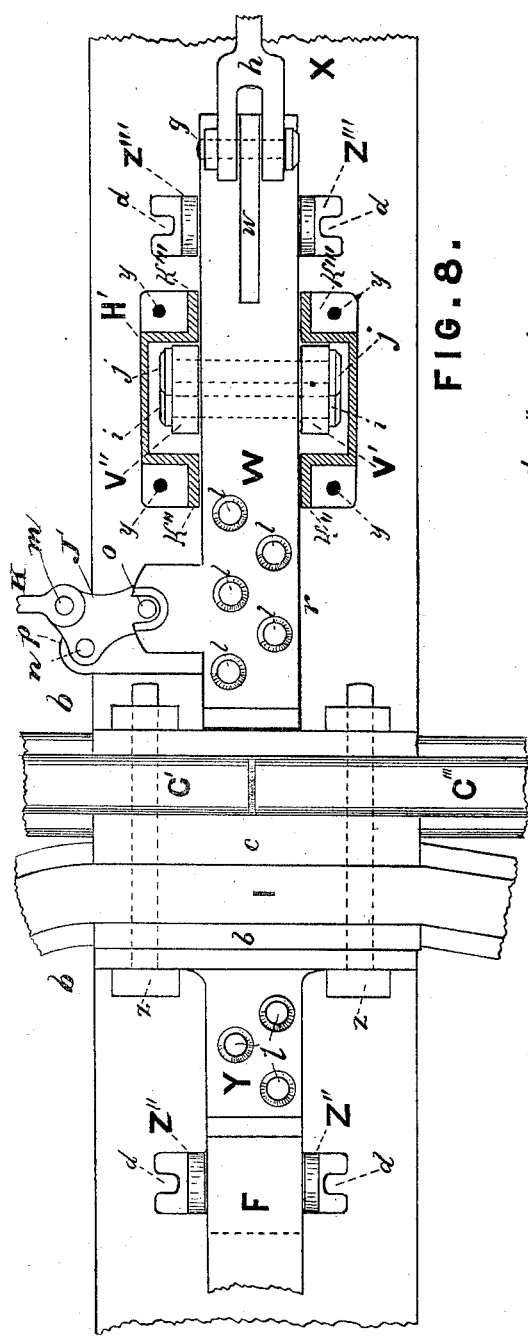
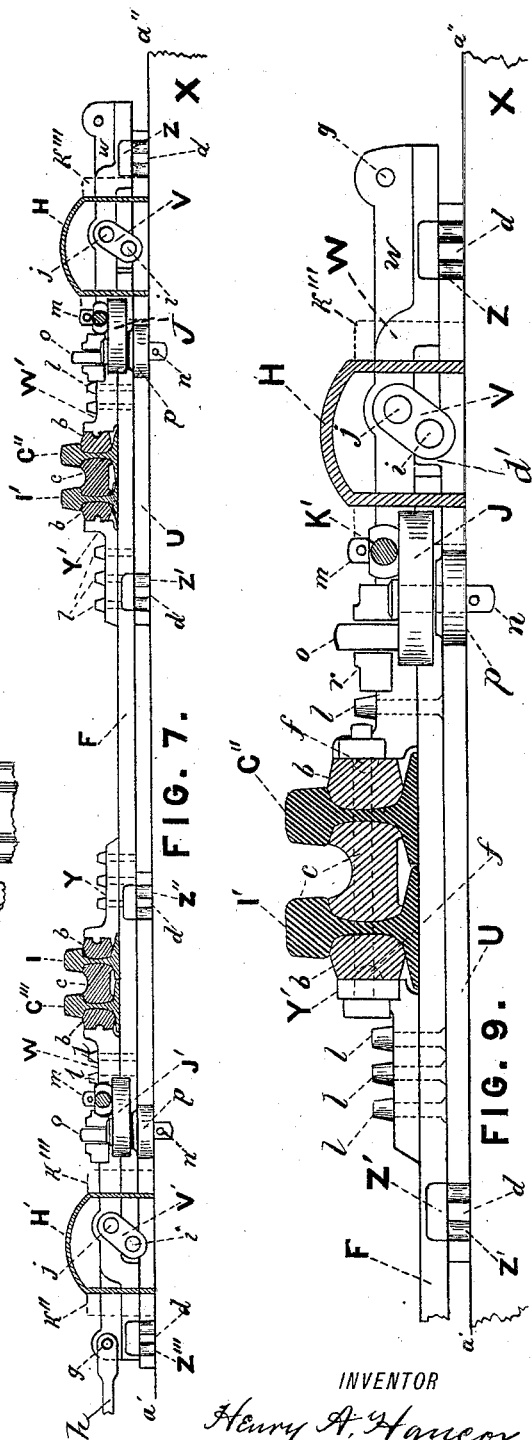
WITNESSES:
Philip L. Masi
Geo. H. Parmelee
INVENTOR
Henry A. Hancox
BY
E. W. Anderson
ATTORNEY.

(No Model.) 3 Sheets—Sheet 3.
H. A. HANCOX.
AUTOMATIC RAILWAY SWITCH.
No. 467,409. Patented Jan. 19, 1892.
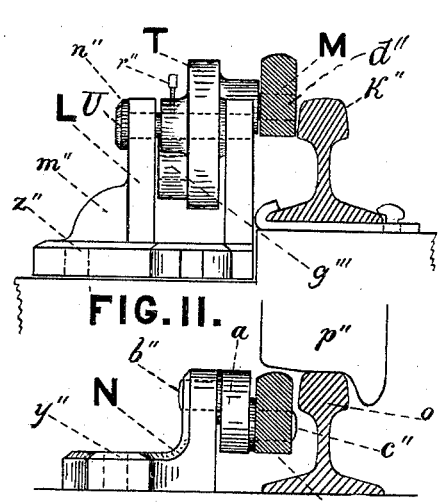
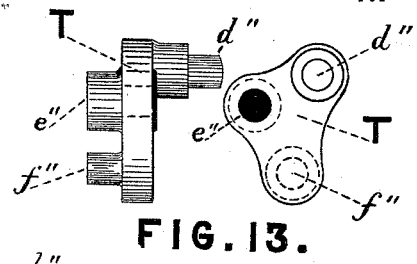
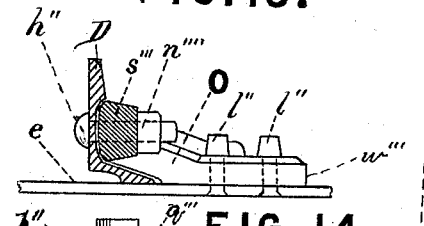
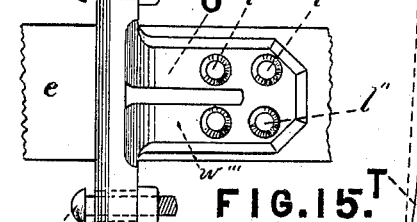
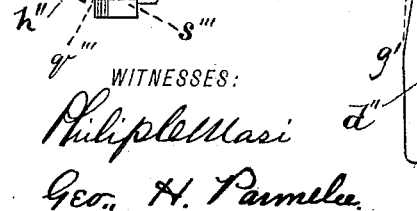
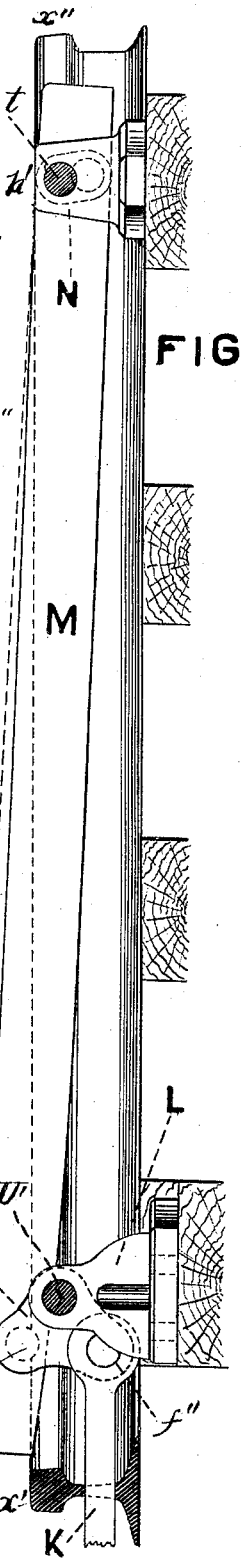
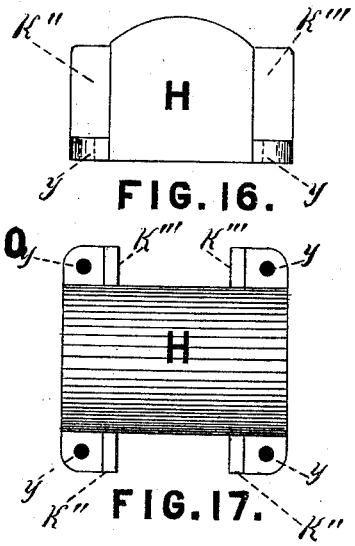
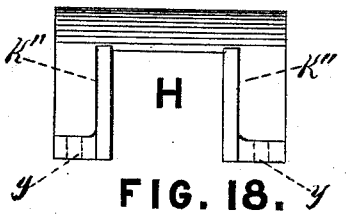
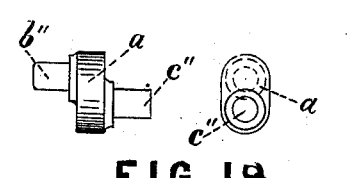
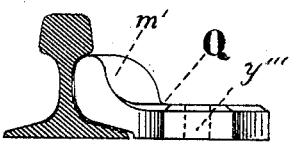
WITNESSES:
Philip C. Masi
Geo. H. Parmelee
INVENTOR
Henry A. Hancox
BY E. W. Anderson
ATTORNEY.

UNITED STATES PATENT OFFICE.

HENRY A. HANCOX, OF MELROSE, MASSACHUSETTS.

AUTOMATIC RAILWAY-SWITCH.

SPECIFICATION forming part of Letters Patent No. 467,409, dated January 19, 1892.

Application filed May 29, 1891. Serial No. 394,606. (No model.)

*To all whom it may concern:*

Be it known that I, HENRY A. HANCOX, a citizen of the United States, and a resident of Melrose, in the county of Middlesex and State of Massachusetts, have invented certain new and useful Improvements in Automatic Railroad-Switches; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a plan view. Fig. 2 is a side elevation of a part of the mechanism. Fig. 3 is a sectional view on the line 1 1, Fig. 1. Fig. 4 is a sectional view on the line 2 2, Fig. 1. Fig. 5 is a side elevation and cross-section of one of the rail-holding blocks. Fig. 6 is a plan view of the joint brace and block. Fig. 7 is a transverse sectional view on the line 3 3, Fig. 1. Fig. 8 is a plan view of a portion of the bed-plate, showing the parallel link action. Fig. 9 is an elevation, partly in section, of the same. Fig. 10 is a side elevation showing one of the wheel-beams in position. Fig. 11 is an end elevation, partly in section, showing the wheel-beam and its bell-crank mechanism. Fig. 12 is a similar view showing the swinging pivot or link. Fig. 13 shows details of the bell-crank devices. Fig. 14 is a side elevation, partly in section, of the fixed point-braces. Fig. 15 is a plan of the same. Figs. 16, 17, and 18 are respectively a side elevation, plan, and end elevation of a snow-box. Fig. 19 is a detail of the link forming the swinging pivot of the wheel-beam. Fig. 20 is a detail of a support-brace for the fixed point-rails.

The object of my invention is to provide a railroad-switch so constructed that it will automatically avert the danger of an imperfect track, lock itself during the transit of a train, and rectify the trailing end of running "off point."

My invention embraces certain improvements relating, mainly, to jointed-rail switches of the character described in Letters Patent issued to Edwin Gordon, of Hyde Park, Massachusetts, No. 307,189, granted October 28, 1884; No. 348,006, granted August 24, 1886, and No. 377,713, granted February 7, 1888.

The improvements for which I desire Letters Patent refer to the introduction of new mechanical features into the general construction of such a switch, of novel combinations, and important additions, all as hereinafter set forth.

In my invention it is designed to accomplish the switching by the use of two fixed point-rails in connection with jointed switch-rails and attached guard-rails with blocks and fillers at joints substantially as set forth in the Letters Patent above referred to; but my invention embraces mechanical additions thereto and original features and combinations for the purpose of perfecting the mechanism, and particularly it will be observed that I employ parallel moving links at opposite ends of the center plate which holds and operates the jointed switch-rails, thereby providing a parallel movement of said center plate. Also, in my invention the lifting up of the links above the surface-line of the head-block, as shown in the accompanying drawings, is designed to eliminate the pocket formerly created by notching into the head-block, as shown in Fig. 6 of the before-mentioned Patent No. 377,713, wherein ice and other obstructions collected and interfered with the action of the links, and the snow-boxes for covering the same and protecting the mechanism from inclement weather and the accumulation of miscellaneous débris are important devices of structural character. I have also provided joint-blocks having oval depressions and corresponding beads on the joint-braces which permit the angle-blocks to be reversed for a right or left switch while it locks them in allowing only a longitudinal movement; also, the fixed joint-braces with elongated bolt-holes and ordinary track-bolts that allow for expansion and contraction; also, attention is directed to the sectional shape of the point, which embodies great strength and ample stock without encroaching on the flange-line; also, the swinging pivot on the heel of the wheel-beam having a movement equal to the ordinate of the arc circumscribed in the motion of the vertical bell-crank; also, the parabolic curvature of the concave upper edge of the wheel-beam, as shown in the accompanying drawings, in order that the angle of wheel contact may be infinitesimal and the inertia gradually overcome; also, the combination of the tension-screw or turn-buckle with the connecting-rod, thereby regulating the exposure of the wheel-beam to the wheel; also, the form and construction of the inside rail-brace, which is designed to clear the wheel-flange and to embody a maximum strength with a minimum of material.

In the accompanying drawings, Fig. 1 is a plan view of the switch, wherein the letters A A' A'' A''' represent the main-track and B B' the side-track rails. C C' C'' C''' are the jointed switch-rails, and D D' the fixed points. E represents the location of the center mechanism, and F the tie-bar riveted at opposite ends to the under-shouldered castings W W', as shown in Figs. 1, 2, 7, 8, and 9, respectively. G designates the position of the switch-stand, and $h$ the switch-bar for operating the switch. H H' are snow-boxes that cover the links V V', Figs. 7, 8, 9, 16, 17, and 18. I I' are the guard-rails moving with and attached to the jointed rails at their moving joints by being bolted through the blocks and fillers, as shown in Figs. 1, 7, 8, and 9, and secured by additional bolts $q'$ $q'$ to the switch-rails C'' C''' through short bracing tubes or pipes $q''$. J J', Figs. 1, 7, 8, and 9, are horizontal bell-cranks connected by the rods K K' to the vertical bell-cranks T T', Figs. 1, 10, 11, and 13, which pivot in the standards L L' and act with the wheel-beams M M', Figs. 1, 10, and 11, which in turn pivot in the heel-standards N N', substantially as shown in Figs. 1, 10, 12, and 19. O O' O'' O''', Figs. 1, 14, and 15, are braces for holding the fixed points in position and are fastened by the track-bolts $h''$ $h''$, said braces being secured to the surface-plates $e$ $e$ $e$ $e$, which are securely spiked to the cross-ties. P P and R R R R are joint-braces, having projecting beads $f$ $f$ on their inner sides, as shown in Figs. 4, 5, and 6, which fit into corresponding depressions $f'$ $f'$ in the blocks $b$ $b$ $b$ $b$, Fig. 4. S is an ordinary tie-rod to hold the rails true to gage. Y Y', Figs. 1, 2, 7, 8, and 9, are inside braces riveted to the tie-bar F, and, in combination with the castings W W', serve to hold the jointed rails and guards securely in their places. These inside braces have projecting beads $f f$, similar to those on the joint-braces R R and P P, and shown in Fig. 2, for interlocking the center blocks $b$ $b$. Z Z' Z'' Z''' in Figs. 1, 2, 7, 8, and 9 are ears projecting from the bed-plate casting U, Figs. 2, 7, and 9, having spike-holes $d$ $d$ for fastening the plate to the head-block X.

Fig. 2 shows a side elevation of one-half the center plates, the tie-plate F, the bossed bed-plate U, the raised plate-boss $d'$ for the pivot $i$, and the upper casting W for the pivot $j$; also the manner of riveting the tie-bar F to the castings W and Y, and the projecting beads $f$ $f$ for interlocking in the blocks $b$ $b$, as described elsewhere.

Fig. 3 is a sectional view through the blocks $b$ $b$ and rail near the bolt-holes of said blocks.

Fig. 4 is a sectional view, where the joint-braces R R are interlocked with the blocks $b$ $b$, while Fig. 5 is a side elevation and center section of the block $b$, showing the elongated holes $h'$ and the channel $f'$ for receiving the bead $f$, as hereinbefore described.

Fig. 6 is a plan view of the joint-brace R and block $b$ interlocked.

Fig. 7 is a sectional elevation through the head-block X, and shows the parts of the parallel link action.

Figs. 8 and 9 are enlarged plan and elevation drawings of one-half the same seen from the opposite direction. The castings W W and Y Y are preferably of steel and riveted to the tie-bar F by the bolts or rivets $l$, as hereinbefore described. Sectional views of the switch-rails C'' C''', guards I I', reversible blocks $b$ $b$ $b$ $b$, and fillers $c$ $c$ are shown in Figs. 7 and 8; also, the links V V' V'', pivoted at $i$ $i$ on the bed-plate U, which in turn is spiked to the head-block at Z Z' Z'' Z'''; also, the snow-boxes H H', and the horizontal bell-cranks J J', pivoting at $n$ $n$ on projecting arms $p$ $p$ from the bed-plate U and interlocking by the pins $o$ $o$ in jaws of the arms $r$ $r$ projecting from W W'. Said bell-cranks, being attached by their duplicate arms to the connecting-rods by the pins $m$ $m$, are more particularly represented in Figs. 7, 8, and 9.

Fig. 10 is a side elevation of the wheel-beams M M', wherein M is the beam; T, the vertical acting bell-crank; K, the pull-rod, and N the heel-standard. The beam M is concave on its upper surface to conform to a parabolic curve, of which the dotted line from $g'$ to $h'$ represents the chord, while $x'$ $x''$ indicate the surface-line of the track.

Fig. 11 is an end elevation of the vertical bell-crank and standard, with sectional views of the wheel-beam M and pin $d''$.

Fig. 12 represents the swinging pivot or link and its standard with section of wheel-beam M.

In Fig. 13 are shown a side and end elevation of the vertical bell-crank, $d''$ representing the stud holding the wheel-beam M, and $e''$ the bearing receiving the pivot-pin $n''$ and $f'''$, and the pin $v$, which connects the pull-rod K, as shown in the elevation, Fig. 10.

Fig. 14 is a side elevation of the fixed point-braces O O' O'' O''', with section of an arm $s'''$, having therein elongated bolt-holes $q'''$, being the part that is riveted to the surface-plate $e$.

Fig. 15 is a plan of the same.

Fig. 16 is a side elevation of the snow-box H, wherein K'' K''' are the wings, and $y$ $y$ are the spike-holes. Fig. 17 is a plan, and Fig. 18 an end elevation, of the same.

Fig. 19 represents end and side elevations of the link $a$, which forms the swinging pivot in the standard N at the heel of the wheel-beam M. This figure shows the pivot-studs of said link.

Fig. 20 is a side elevation of the braces Q Q, which, in combination with the braces O O' O" O''', support and secure the fixed points.

It will be seen by consulting Fig. 1 that when the switch is set for the main track the continuous stock-rails A' A''' form, with the jointed rails C' C''' of this side, a straight line, while the opposite jointed rails C C'' form an angle which shelters the point D traversed. When the switch is thrown on the siding, their relative position is reversed by shifting the angle to the opposite jointed rails C' C''', which then in their angular relation shelter the contiguous point D'. The parallel motion links connect the upper and lower set of plates of the head-block mechanism with the attached guard-rails and lift the upper plate and jointed rails whenever the switch is shifted to form the continuity of main or side track. The great advantage in introducing parallel moving links at opposite ends of this center-plate is to secure parallel motion of the tie-plate and thus overcome its liability to impinge upon the bed-plate while in transit.

The elevation of the link mechanism V V' above the plane of the bed or surface plate and covering it with the snow-boxes H H' serves to prevent injury from ice and débris. The parts are all above the level of the surface of the head-block represented at $a'$ $a''$. The snow-box H is notched at each side for the passage of the tie-plate and is securely spiked at $y$ $y$ to the head-block X. The blocks $b$ $b$ have horizontally-elongated bolt-holes $h'$ $h'$ to allow a slight horizontal movement of the rail when expanding or contracting on account of change of temperature. The channel $f'$ is exactly in the center of the faces of the block, thereby permitting the blocks to be reversed for a right or left switch. The inner surfaces, in direct contact with the rail itself and corresponding with it in sectional shape, are cut away from their centers toward their extremities, as indicated at $b^4$, sufficiently to permit the lateral movement of the shifting-rail. The bead $f$ on the brace R has the form of the corresponding channel $f'$ on the block $b$ in cross-section, but is not so long, (see Figs. 4, 5, and 6, Sheet 1,) and when block $b$ is bolted to the rail with the braces R R, interlocked by the beads $f$ $f$ and spiked to the sleeper, only a longitudinal movement, limited to the excess of the length of the channel $f'$ over the length of the bead $f$, is possible. The swinging wheel-beam M is concave on its upper surface (see Fig. 10, Sheet 3) to exactly conform to a parabola, the point of departure being at $h'$, about one foot from the heel end. The curvature terminates at $g'$, near the vertical bell-crank T at the opposite end, which operates the switch by the pull-rod K. The heel-pivot N swings on the link $a$, with offset-studs $b''$ $c''$ on opposite sides, (see Figs. 12 and 19, Sheet 3,) the movement being equal to the forward movement of the stud $d''$ of the vertical bell-crank T, pivoting at U' in the standard L, Fig. 10.

The switching is accomplished by the parallel center link mechanism throwing over the continuous jointed rails against the points, which are fixed and immovable. When the switch is misplaced to a train trailing therethrough, the beams M M' rise up on guard, alternating in their action to correspond with the position of the switch itself, M protecting the main line and M' the side track. When the switch is on the main line, the wheel-beam M' is up or on guard (see Fig. 1, Sheet 1) and M is down below the surface-line of the rail; but when set for the siding, the wheel-beam M rises up and M' falls, so as to clear the passing wheels.

By the under-shouldered construction of the castings W W', to which is riveted the tie-bar F, it will be seen that the links V V' are elevated above the head-block X, obviating the necessity of making pockets or seats in said block for the lower ends of the links.

The pull-rods K K' may each be formed in two sections connected by a turn-buckle or tension device $n'''$, by means of which the length of said rods and the consequent exposure of the wheel-beams may be regulated.

Having described this invention, what I claim, and desire to secure by Letters Patent, is—

1. In a joint-rail switch, the combination, with the fixed rail-points, the joint-rails, and guard-rails spanning the moving joints, of the bed-plate on the head-block, the tie-plate carrying the joint-rails and guard-rails, the parallel moving links connecting the tie-plate and bed-plate, and the operating switch-rod, all above the plane of the upper surface of the head-block, substantially as specified.

2. In a joint-rail switch, the combination, with the fixed rail-points, the joint-rails, and guard-rails connected to said joint-rails, of the bossed bed-plate, the tie-plate carrying the joint-rails and guard-rails, the under-shouldered end castings of said tie-plate, the parallel moving links connecting the bed-plate and tie-plate, and the operating switch-rod, substantially as specified.

3. In a joint-rail switch, the combination, with the fixed rail-points, the joint-rails, and guard-rails, of the bed-plate on the head-block, the tie-plate carrying the joint-rails and guard-rails, the quadruple parallel moving links connecting the tie-plate and bed-plate above the level of the upper surface of the head-block, the concave-edge wheel-beams, the vertical bell-cranks and the standards, the horizontal bell-cranks on said bed-plate, and the connecting-rods from said vertical to said horizontal bell-cranks, substantially as specified.

4. In an automatic joint-rail switch, the combination, with fixed rail-points, the joint-rails, and guard-rails, of the bed-plate on the head-block, the tie-plate carrying the joint-rails and guard-rails, the parallel moving links connecting the tie-plate and bed-plate above the plane of the head-block, the horizontally-swinging wheel-beams, the vertical bell-cranks, the standards, the horizontal bell-cranks, their connecting-rods, and the swinging links of the wheel-beams, substantially as specified.

5. In an automatic switch, the combination, with fixed rail-points, the joint-rails, and guard-rails, of the bed-plate on the head-block, the tie-plate carrying the joint-rails and guard-rails, the parallel moving links connecting the tie-plate and bed-plate above the level of the upper surface of the head-blocks, the concave-edge horizontally-swinging wheel-beams conforming to a parabolic curve, the bell-cranks, and their connecting-rods, substantially as specified.

6. In a switch, the combination, with the joint-rails and their tie-plate, of the bossed bed-plate on the head-block, the under-shouldered end castings of said tie-plate, the parallel moving links, and the snow-boxes, substantially as specified.

7. The plate-castings W, W', and U, by which the links V V' are elevated above the head-block X, in combination with the boss $d'$ on the bed-plate U for holding the pivot $i$ and another on the plate W for holding the bolt $j$, the bead $f$ for interlocking with the block $b$, the bolt-hole $g$ for attaching the switch-rod $q$, the arm $r$ for holding the stud $o$, the bell-crank J, the double sets of links V V' V'' V''', snow-boxes H H', and jointed rails C C' C'' C''', substantially as and for the purpose set forth.

8. The parallel motion link attachments at opposite ends of the center mechanism, in combination with the bed-plate U, upper plate F, and castings W W', jointed rails C C' C'' C''', and snow-boxes H H', as and for the purposes set forth.

9. The snow-boxes H H', the wings K'' K''', and ears Z Z' Z'' Z''' for the spike-holes $d\ d$, in combination with the links V V' V'' V''', bed-plate U, and upper plates W W', riveted to the connecting-bar F and supporting the jointed rails C C' C'' C''', secured by the blocks $b\ b$, and filler $c$, substantially as set forth.

10. The blocks $b\ b$, having curved channels $f'$ for receiving the corresponding shaped bead $f$ of the braces R, with the elongated bearings $h'\ h'$ for receiving the bolts $h''\ h''$, in combination with the jointed rail C C'' and braces R R, substantially as set forth.

11. The sectional fixed point-rail D, in combination with the track-bolt $h^2$, the brace O, having elongated bolt-holes, and the surface plate $e$, substantially as and for the purposes set forth.

12. The concave-edge rising-bar or wheel-beam M, conforming to a parabolic curve, in combination with the vertical bell-crank T, the pull-rod K, and the swinging pivot $a$, suspended from the standard N by the link and offset studs $b^2\ c^2$, set on opposite faces, substantially as and for the purposes set forth.

13. The wheel-beam M M', bell-cranks T T' J J', pull-rods K K', turn-buckles $n^3$, center plates F W W', parallel motion links, snow-boxes H H', bed-plate U, blocks $b\ b$, fillers $c\ c$, guard-rails I I', and jointed rails C C' C'' C''', in combination with fixed rail-points D D', substantially as and for the purposes set forth.

14. The combination, with the fixed point-rails, of the fixed braces O therefor, said braces being riveted to surface-plates and having arms provided with elongated holes, through which pass track-bolts $h^2$, substantially as specified.

In testimony whereof I affix my signature in presence of two witnesses.

HENRY A. HANCOX.

Witnesses:
PHILIP C. MASI,
GEO. H. PARMELEE.